United States Patent
Benz et al.

(10) Patent No.: US 6,676,907 B1
(45) Date of Patent: *Jan. 13, 2004

(54) ARRANGEMENT FOR GENERATING A HYDROGEN-CONTAINING GAS

(75) Inventors: Uwe Benz, Uhldingen-Müehlhof (DE); Stefan Boneberg, Beuren (DE); Stefan Brauchle, Biberach/Riss (DE); Dirk Georg, Kirchheim/Nabern (DE); Martin Schäfer, Kirchheim (DE); Martin Schüssler, Ulm (DE); Matthias Wolfsteiner, Alesheim (DE)

(73) Assignee: Ballard Power Systems AG, Kirchheim/Teck-Nabern (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/444,565

(22) Filed: Nov. 19, 1999

(30) Foreign Application Priority Data

Nov. 19, 1998 (DE) .......... 198 53 379

(51) Int. Cl.⁷ .................... B01J 8/04
(52) U.S. Cl. .......... 422/193; 422/188; 422/189; 422/190; 422/191; 422/194; 422/198; 422/206; 422/211; 48/127.9; 48/198.3; 48/198.7
(58) Field of Search ............ 422/187, 188, 422/189, 190, 191, 193, 194, 198, 206, 211; 48/127.9, 198.3, 198.7; 429/13, 17, 19

(56) References Cited

U.S. PATENT DOCUMENTS

| 5,516,344 | A |   | 5/1996  | Corrigan ............... 48/127.9 |
| 5,518,705 | A | * | 5/1996  | Buswell et al. .......... 423/247 |
| 5,672,629 | A | * | 9/1997  | Heil et al. ............... 518/704 |
| 6,086,839 | A | * | 7/2000  | Autenrieth et al. ...... 252/373 |
| 6,096,286 | A | * | 8/2000  | Autenrieth .............. 252/373 |
| 6,299,853 | B1| * | 10/2001 | Boneberg et al. ....... 252/373 |

FOREIGN PATENT DOCUMENTS

| DE | 19754012 A1 |   | 5/1997  |
| EP | 0 921 584   |   | 11/1998 |
| JP | 08012301 A  |   | 5/1994  |
| JP | 07126001 A  | * | 5/1995  |
| JP | 08301601 A  |   | 8/1995  |
| WO | WO 98/08771 |   | 3/1998  |

* cited by examiner

*Primary Examiner*—Jerry D. Johnson
*Assistant Examiner*—Basia Ridley
(74) *Attorney, Agent, or Firm*—Crowell & Moring LLP

(57) ABSTRACT

An arrangement for generating a hydrogen-containing gas from a hydrocarbon-containing medium includes a multi-stage reforming unit that is connected to a multi-stage carbon monoxide removal unit by a heat-conducting separating medium. The stages of the reforming unit, in an ascending order relative to the gas flow direction in the reforming unit, are in a thermal contact with stages of the carbon monoxide removal unit, in a descending order relative to the gas flow direction in the carbon monoxide removal unit.

3 Claims, 1 Drawing Sheet

ARRANGEMENT FOR GENERATING A HYDROGEN-CONTAINING GAS

BACKGROUND AND SUMMARY OF INVENTION

The present invention relates to an arrangement for generating a hydrogen-containing gas.

Arrangements of this type are known, for example, as mobile methanol reforming systems for fuel-cell-operated motor vehicles in order to provide the hydrogen required for the fuel cells. Particularly for this mobile application, there are the requirements (1) of rapidly reacting to typical load changes in the vehicle, and (2) of being able to supply hydrogen for the fuel cells as fast as possible after the system start, and achieving this by means of a relatively compactly constructed reforming system.

As known, the water vapor reforming reaction for reforming a hydrocarbon, such as methanol, takes place endothermally and at a reaction temperature increased with respect to room temperature. In the case of a cold start of the reforming system, hydrogen can therefore not be provided immediately with water vapor reforming. On the contrary, the components of the system must first be brought to a corresponding operating temperature. Specifically, in fuel-cell-operated motor vehicles, there is a desire to reach the warmed-up normal operation as fast as possible in order to feed the fuel cells as early as possible with hydrogen generated in a continuous driving operation.

Various measures have been suggested for an accelerated cold start of a reforming system. Thus, it is suggested in U.S. Pat. No. 5,516,344 to integrate the reformer together with a carbon monoxide shift converter connected behind it in a common housing to which a burner is assigned that burns a supplied combustible mixture. As a result of the hot combustion exhaust gases, among others, the reformer and the carbon monoxide shift converter are heated.

In German Patent Application DE 197 54 012, a reformer and a carbon monoxide removal unit are each constructed in several stages and the stages of the reformer and the carbon monoxide removal units each form a heat transfer structure. In this case, the carbon monoxide removal unit is composed in a modular manner of a carbon monoxide oxidation unit and of a carbon monoxide shift reaction unit.

Despite the improvement in the dynamics of such systems, a further increase of the dynamics is desirable for fast load changes and for a large load spread in mobile applications. It is an object of the present invention to provide an arrangement for generating a hydrogen-containing gas from a hydrocarbon-containing medium in which the above-mentioned problems are improved.

According to the present invention, the stages of a reforming unit in an ascending order relative to a gas flow direction in the reforming unit are thermally coupled with stages of a carbon monoxide removal unit in a descending order relative to the gas flow direction of a reformate in the carbon monoxide removal unit, which reformate is provided by the reforming unit and is supplied to the carbon monoxide removal unit. The coupling of the stages takes place by way of a heat-conducting separating medium so that the stages of the reforming unit and of the carbon monoxide removal unit are each in a thermal contact with one another. The special advantage of the present invention is that the temperatures in the reforming unit, in the case of a full load, permit good utilization of the used reforming catalyst. The last coupled carbon monoxide removal stage only has a low carbon monoxide concentration, in which case, in a particularly advantageous manner, also a carbon monoxide formation can be prevented by a so-called reverse shift reaction at a small load. Likewise, by means of the improved dynamics, fast load changes are possible while the load spread is large.

In a preferred embodiment of the present invention, the gas flow direction in the reforming unit and in the carbon monoxide removal unit take place in the same direction.

A particularly preferred embodiment is a two-stage arrangement of the reforming unit and the carbon monoxide removal unit. It is advantageous to provide a carbon monoxide oxidation stage as the carbon monoxide removal unit. In this case, it is particularly advantageous to connect the first stage of the reforming unit with the second stage of the carbon monoxide removal unit and to connect the first stage of the carbon monoxide removal unit with the second stage of the reforming unit.

An arrangement of the reforming unit and the carbon monoxide removal unit in a joint housing is particularly compact. In this case an advantageous thermal coupling between the modules is possible.

Other objects, advantages and novel features of the present invention will become apparent from the following detailed description of the invention when considered in conjunction with the accompanying drawings.

DETAILED DESCRIPTION OF THE DRAWINGS

In a conventional fuel cell system, in which the arrangement according to the present invention can be used in a particularly advantageous manner, liquid fuel, particularly a hydrocarbon, is evaporated in an evaporator and is supplied to a reformer, in which a hydrogen-containing gas with admixtures of carbon monoxide is obtained. In a gas purification stage, the carbon monoxide is largely removed from the hydrogen-containing gas and the purified gas is fed as fuel gas to an anode space. However, the present invention is not limited to the use in such a special fuel cell system.

Figure 1:
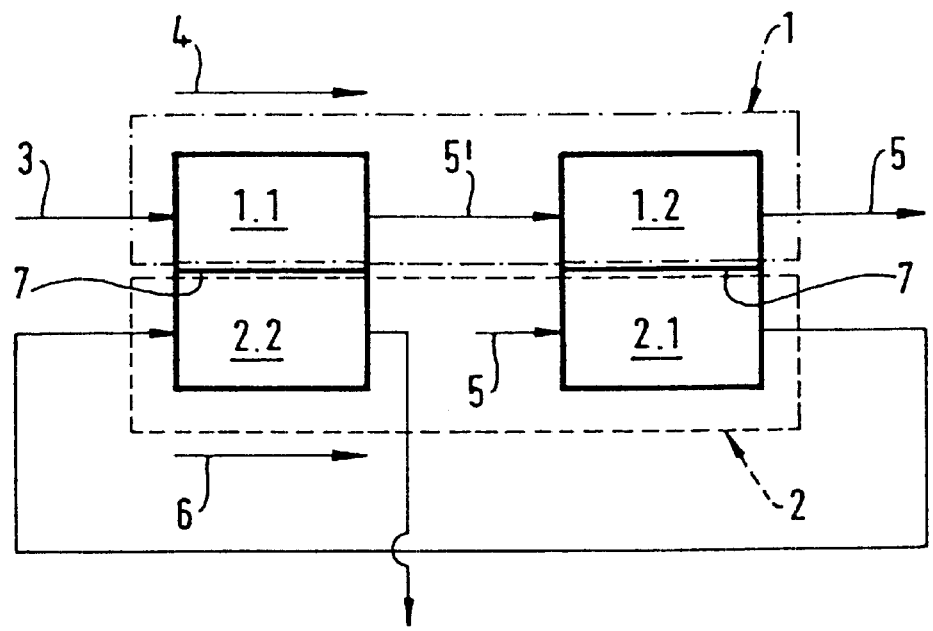
FIG. 1 is a basic diagram of an arrangement according to the present invention.

The basic diagram of an arrangement according to the present invention illustrated in FIG. 1 shows (1) a preferred two-stage reforming unit 1 with stages 1.1 and 1.2, and (2) a preferred two-stage carbon-monoxide removal unit 2 with stages 2.1 and 2.2. The multi-stage reforming unit 1 and the multi-stage carbon monoxide removal unit 2 are conventionally connected with further units, which are not shown, for operating a fuel cell system. A conventional measuring of air into the carbon monoxide unit 2 is not illustrated separately. Normally, the reformate 5 at the output of the last stage 1.2 of the reforming unit 1 forms a carbon-monoxide-containing medium 5 which flows through the carbon monoxide removal unit 2.

In the case of more than two-stage reforming units and/or carbon monoxide removal units, in a correspondingly preferred manner, the first stage of the reforming unit is thermally coupled with the last stage of the carbon monoxide removal unit and the respective stages of the reforming unit arranged in each case in-between are thermally coupled according to their sequence relative to the gas flow direction with the respective stages of the carbon monoxide removal unit in an analogous sequence and manner.

In the reforming unit 1, a hydrocarbon-containing medium 3 flows in a direction 4 through the unit 1 and, in the carbon monoxide removal unit 2, a carbon-monoxide-containing reformate 5 flows in a direction 6 through the unit 2. The respective flow direction is indicated in the figure only for a coupled stage with a first stage of the reforming unit 1 and a second stage of the carbon monoxide removal unit 2.

Preferably, the second stage 1.2 of the reforming unit 1 is thermally coupled with the first stage 2.1 of the carbon monoxide removal unit 2, and the first stage 1.1 of the reforming unit 1 is thermally coupled with the second stage 2.2 of the carbon monoxide removal unit 2. The coupling takes place by way of a separating medium 7 that permits a thermal contact between the coupled stages 1.2 and 2.1, or 1.1 and 2.2. The reformate between two successive stages 1.1, 1.2 of the reforming unit is marked 5'. The hydrocarbon-containing medium 3 is preferably a water/hydrocarbon mixture.

As the result of the coupling of the second carbon monoxide removal unit stage 2.2 with the first stage 1.1. of the reforming unit 1, the output temperature of the second stage 2.2 of the carbon monoxide removal unit 2 is low because, as the result of the endothermal reaction in the first reforming stage 1.1, the reactor temperature at the output of the carbon monoxide removal unit 2 is clearly lowered by the thermal coupling. This results in an advantageous low carbon monoxide outlet concentration of the carbon monoxide removal unit 2.

The resulting temperature profile can be adjusted by way of an air apportioning in the carbon monoxide removal unit 2 largely independently of the load. Thus, high dynamics of the system can be achieved. In principle, a measured introduction of air can also be individually adjusted at any stage 2.1, 2.2 of the carbon monoxide removal unit 2. This additional measure is not illustrated in the figure.

A preferred embodiment of the system is in the co-current flow so that the respective gas flows in the same direction through the reforming unit 1 and the carbon monoxide removal unit 2. In this case, the reformate 5 at the output of the last reforming stage 1.2 forms the carbon-monoxide-containing medium 5, which is supplied to the carbon monoxide removal unit 2 at its first stage 2.1 at the input.

The second reforming stage 1.2 is preferably coupled with the first carbon monoxide removal stage 2.1 in order to achieve the residual conversion of the hydrocarbon 3 in the reformer 1. Since a higher reactor temperature can be used in this stage, the reforming catalyst 9 is optimally utilized. The higher reactor temperature is also advantageous for the conversion of the high carbon monoxide concentration in the first carbon monoxide removal unit stage 2.1.

The temperature profile in this stage can also remain high at a partial load so that it can be adjusted also largely independently of the load. Also in these two stages (1.2, 2.1), the through-flow takes place preferably in the co-current flow. The apportioned air quantity into the two carbon monoxide removal units 2.1, 2.2 is preferably selected such that it is sufficient for a complete conversion of the supplied hydrocarbon. A preferred hydrocarbon is methanol or gasoline.

In principle, it is possible, for achieving a favorable temperature profile and a hydrocarbon conversion, which is as optimal as possible, to thermally couple in each case the first stages of the carbon monoxide removal unit 2 and of the reforming unit 1 and the second stages with one another and to carry out the flow through the carbon monoxide removal unit 2 and/or the reforming unit 1 in each case in opposite directions. This is not contained in the figure.

Figure 2:
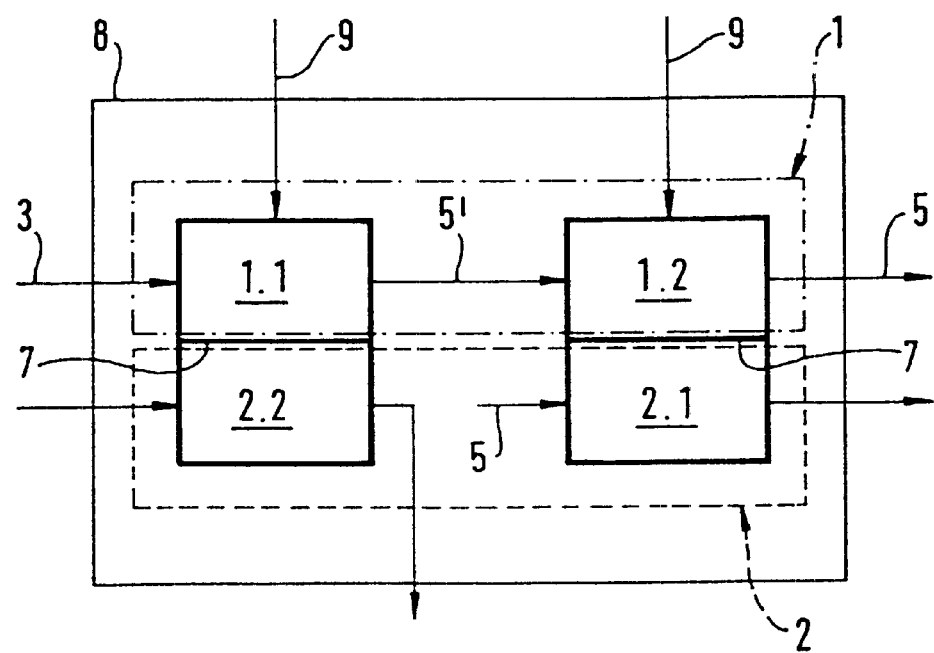
FIG. 2 is a view of an embodiment of an arrangement with a housing according to the present invention.

If the reforming unit 1 and the carbon monoxide removal unit 2 are arranged in a common housing 8, a very compact construction of the arrangement is possible. The common housing 8 is outlined in FIG. 2.

Another advantageous further development of the arrangement according to the present invention consists of providing a lower fraction of a reforming catalyst 9 in stage 1.1 of the reforming unit 1 (which is coupled with the last stage 2.2 of the carbon monoxide removal unit 2) than in stage 1.2 (which is coupled with the first stage 2.1 of the carbon monoxide removal unit 2). This measure has a particularly favorable effect on the temperature profile of the arrangement and thus on the conversion of the hydrocarbon and the carbon monoxide removal. The temperature profile should be as homogeneous as possible at all load points. Ideally, the temperature profile, if possible, should be at the same level there, or should at least not change in the operation.

Each of the individual further developments can be advantageous as a single measure or in combination with one or more of the other indicated measures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for generating a hydrogen-containing gas from a hydrocarbon-containing medium, said apparatus comprising:

a reforming unit having a plurality of stages through which said hydrocarbon-containing medium flows in a first media flow direction;

a carbon monoxide removal unit having a plurality of stages through which said medium discharged from said reforming unit flows in a second media flow direction; and a heat-conducting separating medium which is disposed between and divides said reforming unit and said carbon monoxide removal unit, said heat conducting separating medium providing a heat flow path which couples said plurality of stages of said reforming unit in thermal contact with said plurality of stages of said carbon monoxide removal unit; wherein, said first media flow direction and said second media flow direction are in the same direction; and the stages of the reforming unit in an ascending order relative to said first media flow direction are thermally coupled with the stages of the carbon monoxide removal unit in a descending order relative to said second media flow direction.

2. The apparatus according to claim 1, wherein:

said each of said reforming unit and said carbon monoxide removal unit comprises two stages; and a first stage of said reforming unit is thermally coupled with a second stage of said carbon monoxide removal unit, and a second stage of said reforming unit is thermally coupled with a first stage of said carbon monoxide removal unit.

3. The apparatus according to claim 1, wherein the reforming unit and the carbon monoxide removal unit are arranged in a common housing.

* * * * *